A. KIMBLE.
ALTERNATING CURRENT MOTOR.
APPLICATION FILED MAY 15, 1905.
1,004,437.
Patented Sept. 26, 1911.
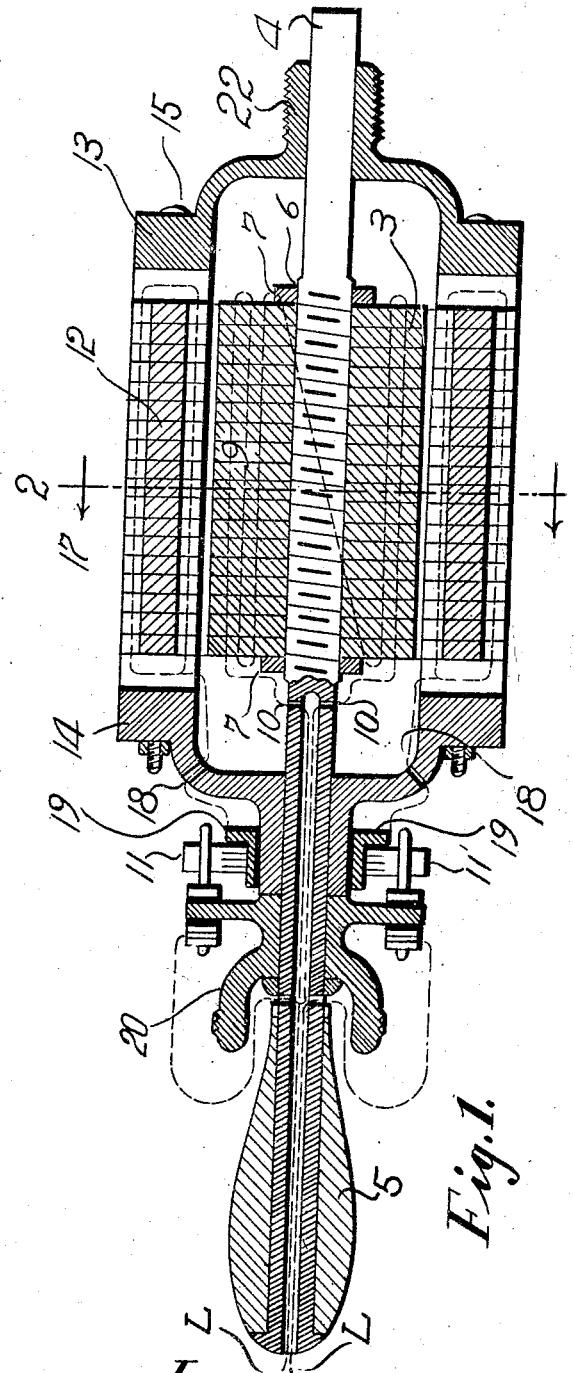
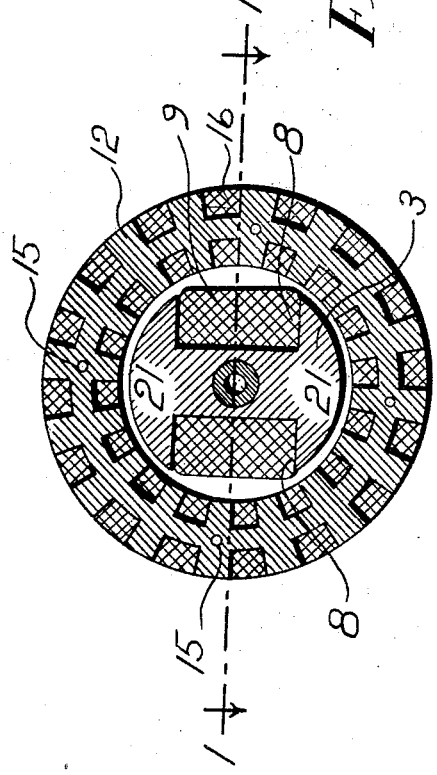
Witnesses:
Milton F. Stein
Glen C. Stephens
Inventor:
Austin Kimble
by Rummler & Rummler
Attorneys

UNITED STATES PATENT OFFICE.

AUSTIN KIMBLE, OF CHICAGO, ILLINOIS, ASSIGNOR, BY DIRECT AND MESNE ASSIGNMENTS, TO KIMBLE ELECTRIC COMPANY, OF CHICAGO, ILLINOIS, A CORPORATION OF ILLINOIS.

ALTERNATING-CURRENT MOTOR.

1,004,437.  Specification of Letters Patent.  Patented Sept. 26, 1911.

Application filed May 15, 1905. Serial No. 260,453.

*To all whom it may concern:*

Be it known that I, AUSTIN KIMBLE, a citizen of the United States of America, and a resident of Chicago, in the county of Cook and State of Illinois, have invented certain new and useful Improvements in Alternating-Current Motors, of which the following is a specification.

The main object of this invention is to provide a simple and improved form of alternating current motor adapted to be conveniently held in the hand of an operator for operating hand tools. This object is accomplished by the device shown in the accompanying drawings, in which:

Figure 1 is a longitudinal section of an alternating current motor adapted to be held in the hand of an operator, the wiring being shown diagrammatically and indicated by dotted lines. Fig. 2 is a transverse section on the line 2—2 of Fig. 1, and shows the shape of the disks which make up the laminated field and armature magnetic frames, the section of the windings of wire being indicated by intersecting cross hatching.

In the construction shown in the drawings, the field magnet 3 is rigidly mounted on a hollow shaft 4, which is held in a fixed position within the handle 5. The shaft 4 is preferably hollow and serves as a convenient retainer for the electrical conductors which furnish power to the motor. One portion 6 of the shaft 4 is threaded and the thin disks of sheet iron which form the laminated field frame are clamped together endwise upon said threaded portion by the nuts 7. The plates which make up the field frame are cut to form, when assembled, a core having substantially cylindrical outer contour and having longitudinal grooves 8 at opposite sides thereof. The field windings 9 are seated in the grooves 8 and the ends of said windings enter apertures 10 and extend through the hollow shaft 4, one of said ends being connected with one of the brushes 11 and the other extending out through the handle to form one of the line conductors L. The other line conductor L' connects with the other brush 1'.

The armature frame consists of a core 12 formed of a plurality of ring shaped disks of sheet iron clamped together between the bearing pieces 13 and 14 by means of longitudinally disposed bolts 15. The bearing pieces 13 and 14 are journaled to rotate on the shaft 4 and the armature core 12 forms a ring surrounding the field core 3. The disks which form the core 12 are stamped with opposed inner and outer radially disposed recesses 16 which form longitudinally disposed grooves in the core when said plates are assembled. The armature windings 17 extend around the armature core in a longitudinal direction, each coil occupying one of said opposing pairs of inner and outer grooves 16. The joints between successive armature coils are connected by wires 18 with the commutator segments 19, or may be connected in any usual manner. The commutator is rigidly secured to the bearing piece 14 and rotates therewith. The bearing piece 13 is externally threaded at 22 for attaching a chuck or other device to be rotated by the motor.

The armature windings consist of insulated iron wire which is seated in the grooves or slots of the armature core and so arranged as to substantially fill said slots and to a large extent take the place of the portions of the laminated core which were cut away to form the slots. The armature winding thus forms a part of the laminated core structure, and insures a substantially uniform path for the magnetic lines of force of the field, and thereby insures a minimum fluctuation of the field flux during the rotation of the armature. By eliminating the fluctuation of the field flux, that part of the induced current in the armature windings which is due to such fluctuation is eliminated.

As will be seen from the drawings, the field and armature windings are connected through the commutator in series with each other.

By using iron wire for winding the armature, I am able to regulate the motor by shifting the position of the brushes with respect to the field poles. The resistance of the iron wire serves to prevent sparking at the brushes due to the short-circuiting of the armature windings by the displacement of the brushes and by the passing of the brushes from one commutator segment to another.

In the operation of the device shown, the handle 5 is held in the hand of the operator and the flow of the current through the armature is regulated by shifting the brushes. The knurled knob 20 which controls the shifting of the brushes, is located in convenient position for being grasped by the thumb and forefinger of the same hand by which the operator holds the handle 5. When the brushes 11 are in the neutral position, the motor will run at its highest speed. When the brushes are shifted toward one side from such position, the armature re-actance opposes the flow of current and reduces the speed. When the brushes arrive at a position at right angles to the neutral position, the motor will cease to operate. Shifting the brushes beyond this line causes the motor to operate in the opposite direction.

What I claim as my invention, and desire to secure by Letters Patent, is:

1. In a device of the class described, the combination of a handle, a field core rigidly secured to said handle in alinement therewith, an annular armature core surrounding said field core and journaled on said handle, windings of wire on said cores, a commutator secured to said armature and rotatable therewith, and a brush holder rotatably mounted between said handle and field core and adapted to hold the brushes in contact with the commutator, said brush holder having an annular part insulated from the brushes and located in axial alinement with the handle and adapted to be shifted by the thumb and forefinger of the hand of an operator, when the same hand is gripping the handle as in guiding the operation of the device.

2. The combination of a handle, an electric motor mounted thereon and adapted to operate a tool carried thereby, a sleeve rotatably mounted on said handle in alinement therewith and adapted to be rotated by the thumb and forefinger of an operator's hand while the same hand is gripping said handle as for guiding the tool, and means adapted to control the speed of said motor through the rotation of said sleeve.

Signed at Chicago this 8th day of May 1905.

AUSTIN KIMBLE.

Witnesses:
E. A. RUMMLER,
RUDOW RUMMLER.

---

Copies of this patent may be obtained for five cents each, by addressing the "Commissioner of Patents, Washington, D. C."